June 30, 1931.    G. S. MERRILL    1,812,752
VARIABLE CHART
Filed April 23, 1930
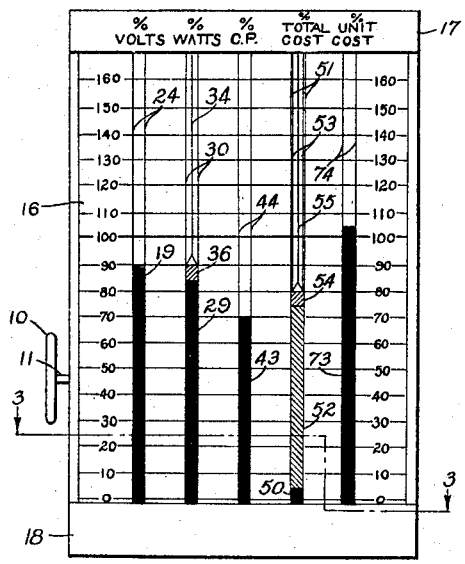
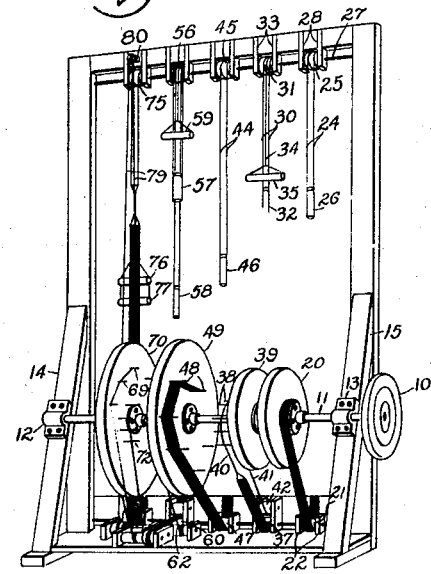
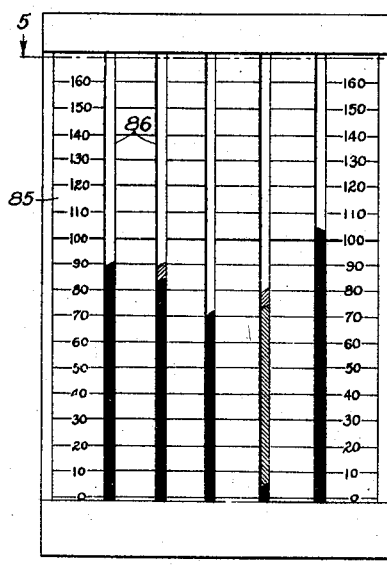
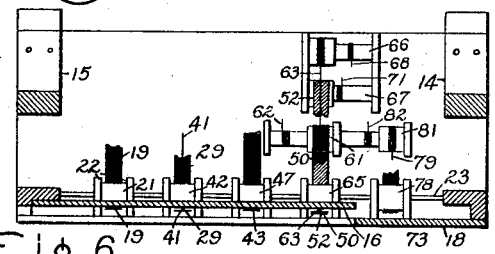
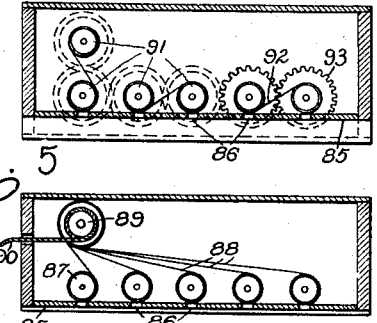
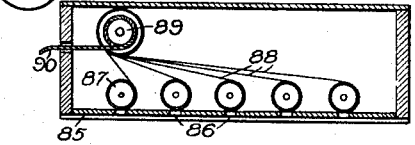
INVENTOR:
GEORGE S. MERRILL,
BY Charles E. Tullar
HIS ATTORNEY.

Patented June 30, 1931

1,812,752

UNITED STATES PATENT OFFICE

GEORGE S. MERRILL, OF SHAKER HEIGHTS, OHIO, ASSIGNOR TO GENERAL ELECTRIC COMPANY, A CORPORATION OF NEW YORK

VARIABLE CHART

Application filed April 23, 1930. Serial No. 446,723.

My invention relates to charts and more particularly to charts comprising movable members for indicating comparative values. Such charts may be used to demonstrate the effect of variations in one or more characteristics which produce corresponding variations in other characteristics. For instance, I have used my chart for demonstrating the effect of voltage variation on such characteristics as the life of incandescent lamps, the amount of energy consumed and the amount of light furnished. The object of my invention is to provide such a variable chart which may be conveniently operated to effectively show comparative results of variation of the value or measure of one or more characteristics.

According to my invention, I provide a chart face board with indicating devices comprising markers movable to various positions to indicate values, the actuating mechanisms of which are interconnected so as to cause a predetermined relation between the values indicated. More specifically, a series of ribbons may be movable across said board or a series of slots may be made in said board with display sheets as indicating devices, each exposed through a slot and movable relatively thereto. The means for moving the ribbons or sheets are interconnected so that they move simultaneously and so as to cause predetermined ratios between the extents of movement of the various ribbons or sheets. Specific examples and mechanisms are shown in the accompanying drawings and described in the accompanying specification from which further advantages of my invention will appear.

In the drawings, Fig. 1 is a front elevation of the chart of my invention; Fig. 2 is a perspective rear view thereof; Fig. 3 is a section along the line 3—3 of Fig. 1; Fig. 4 is a front elevation of a modification; Fig. 5 is a section along the line 5—5 of Fig. 4; and Fig. 6 is a similar section of a chart having a modified form of operating mechanism.

In the chart shown in Fig. 1, the comparative increase or decrease in the values represented by the ribbons is made to appear by turning the wheel 10. This wheel is attached to shaft 11 which is mounted horizontally at the back of the chart and on which the various cams are mounted that operate the ribbons. The two bearings 12 and 13 upon the chart braces 14 and 15 hold this shaft 11 in place and the cams on this shaft draw in or let out the ribbons by their lower ends. Between the chart face 16 and the end boards 17 and 18, there is a narrow opening through which the ribbons or their supporting threads pass. The threads from the upper end of the ribbons pass up behind the top end board 17, over a roller and down to the weights which exert the necessary force to keep the ribbons taut. The lower ends of the ribbons pass behind the bottom end board 18, under a roller and up either to the cam or to a reduction roller which is operated by a cord from a cam.

The value in the first column to the left in Fig. 1 is represented by a single ribbon 19 which is unwound from the pulley 20 on the cam shaft 11 behind the chart. This ribbon passes from the pulley down under roller 21 mounted between the blocks 22 on the rod 23, and up before the face of the chart. The loose end of the ribbon is attached to the threads 24 which go up the face of the chart and behind the top end board 17. Behind this top end board is the grooved roller 25 over which the threads pass down to the weight 26 on the back of the chart. The threads are guided by the grooves in the roller which rides on the long rod 27 and between the blocks 28.

The second column from the left in Fig. 1 is made up of two sections, each being represented by a ribbon of different color and at all times representing by their length their true value. The lower ribbon 29 is kept taut in the same manner as the ribbon on the first column, the threads 30 in this case running over roller 31 and down to the weight 32. As before, the roller is slotted for the threads and rides on the rod 27 but is held between blocks 33. A single thread 34 running over the same roller to the weight 35 performs this operation for the top ribbon 36. The lower ribbon which is in front of the upper ribbon passes down, under roller 37 and part way to the cam formed by long pins 38 in the wheel 39. The cord 40 that replaces this ribbon is wound around the cam form made by the pins whenever shaft 11 is turned, thus creating the necessary motion required to operate this ribbon. The lower end of the upper ribbon 36 passes behind the upper end of the lower ribbon 29 which shields from view the short length of it that is required. Attached to the hidden end of it is the cord 41 which passes down behind the lower ribbon 29, under roller 42 and up over the cam made by the short pins (not shown) in the wheel 39. Complete operating mechanism similar to that used for the first ribbon has now been described for the second set of ribbons.

The third or middle column is represented by a single ribbon 43. The threads 44 fastened to the top of the ribbon pass over roller 45 and down to the weight 46. The lower end of this ribbon passes under roller 47 and around the cam formed by the pins 48 in the side of the wheel 49. This forms a mechanism that operates exactly as the ribbons described before.

The fourth column from the left is made up of three sections each in different color and each representing a particular part of the complete column. The lower section 50 is held in place by the threads 51, the middle section 52 by the threads 53, and the top section 54 by the thread 55. All of the threads pass up behind the top end board 17 over the roller 56 and down to their respective weights 57, 58 and 59. The lower end of section 50 passes down under roller 60 and back around the large part of the reduction roller 61 (Fig. 3). As the cord 62 is wound around the small part of the reduction roller 61 and also rides over the cam formed by the pins (not shown) in the far side of the wheel 49, motion of the cam shaft 11 will be transferred to the ribbon 50. The thread 63 which replaces the top ribbon 54 some distance down behind the middle ribbon 52, follows on with this middle ribbon 52 down under roller 65 and back toward their reduction rollers. The thread 63 winds around the large part of roller 66 while the ribbon 52 goes around the large part of roller 67. Cords from around the small part of the rollers wind around cams on the cam shaft 11 and in this way carry the shaft motion to the ribbons. The cord 68 unwinding from about the small part of roller 66 passes up and about the short pins 69 in the cam wheel 70 and the cord 71 about the small part of roller 67 passes up and around the long pins 72 in the cam wheel. Operation of the three ribbons of this column is therefore accomplished in the same manner as before with the exception of the addition of the reduction rollers.

The fifth column from the left is made up of a single ribbon 73 having more movement than any of the others. The ribbon 73 is held taut in the usual manner, the threads 74 which go over roller 75 behind the top end board 17, pull up on the ribbon with a force equal to the weight of the weights 76 and 77. The lower end of the ribbon 73 by which the column is varied passes down behind the bottom end board 18, over roller 78 and up in back of the chart until a sufficient amount of ribbon has been used to supply the maximum requirements of the face of the chart. This ribbon is then replaced by the cord 79 which passes up through pulley 80 at the top of the chart, then down around the large part of the reduction roller 81. A cord 82 wound around the small part of the roller and over the pins in the far side of the cam wheel 70 completes the operating mechanism of this ribbon.

The chart shown in Fig. 4 is a modified form of the one in Fig. 1 and may be constructed to have either of the operating mechanisms shown in Figs. 5 and 6. The chart front 85 has five vertical slots 86 cut in it which represent the five columns in this particular chart. If this chart is of the type shown in Fig. 5, a window shade roller 87 with a specially painted shade 88 is behind each slot 86. The end of each shade is fastened to the large roller 89 which acts as the master roller on which all of the shades are wound when the rope 90 is drawn off the end of the master roller. This unwinding operation draws before each slot an equal amount of shade from the roller behind the slot thereby producing, if the shades have been painted in graph form, a chart having the necessary fluctuating columns. To hold the shades in any given position the rope 90 may be wound around a peg or any other suitable object. The paint on the shades representing the various values may be in a number of colors, each color representing a particular part of the entire value. In a chart of the type shown in Fig. 6, a roller 91 covered with a wide flexible material 92, such as paper, is mounted behind each slot in the chart face. The material 92 is painted upon both sides and winds off one roller and on to the next. This is accomplished by the gears 93 on the end of each roller which mesh with each of the neighboring gears and thereby form a combination that may be operated by a means of a crank on the end of any one roller. In this form one of the rollers has been set back in the casing as there are an uneven number of slots in the chart face. If a take-up is required because of slack material caused by a number of turns on the rollers, the gears may be made to drive one roller of each pair through a spring.

What I claim as new and desire to secure by Letters Patent of the United States is:

1. In a variable chart, the combination of a face board having a plurality of columns indicated thereon, indicating means disposed adjacent each of said columns comprising a marker movable to various positions in said column and interconnected actuating means for said indicating means comprising means for giving a predetermined relation to the positions of said markers.

2. In a variable chart, the combination of a face board having a plurality of slots therein, indicating means disposed adjacent each of said slots comprising a marker movable to various positions and through a slot, and interconnected actuating means for said indicating means comprising means for giving a predetermined relation to the positions of said markers.

In witness whereof, I have hereunto set my hand this 19th day of April, 1930.

GEORGE S. MERRILL.